Figure 1:
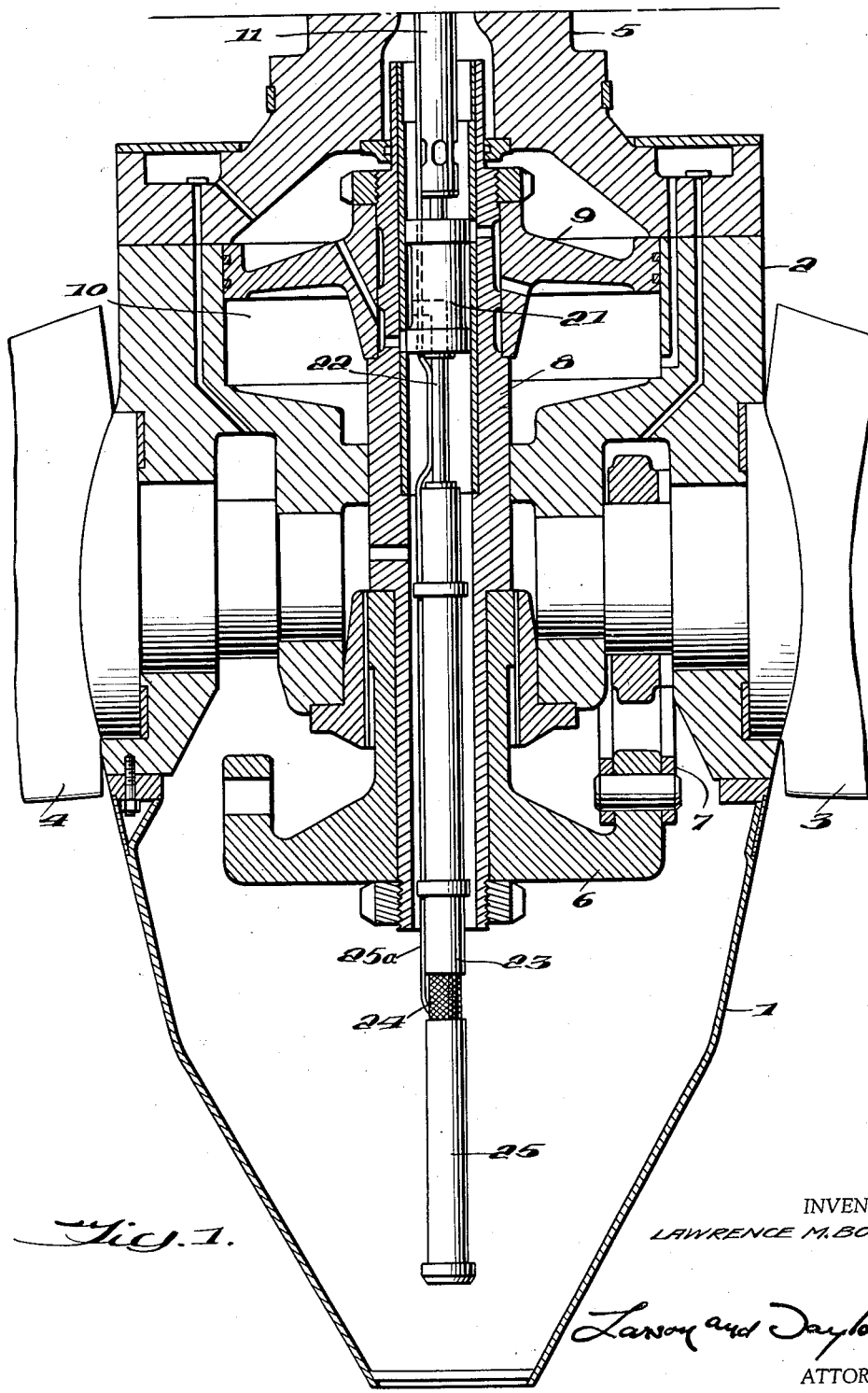

Sept. 1, 1964 L. M. BOYD 3,146,989
RUNNER BLADE SERVO SYSTEM FOR TURBINES WITH OVERRUN
Filed May 9, 1961 3 Sheets-Sheet 2

INVENTOR
LAWRENCE M. BOYD,

ATTORNEYS

United States Patent Office 3,146,989
Patented Sept. 1, 1964

3,146,989
RUNNER BLADE SERVO SYSTEM FOR
TURBINES WITH OVERRUN
Lawrence M. Boyd, Senneville, Quebec, Canada, assignor
to Dominion Engineering Works Limited, Montreal,
Quebec, Canada
Filed May 9, 1961, Ser. No. 108,918
3 Claims. (Cl. 253—31)

This invention relates to hydraulic turbines and pumps and more particularly to a runner blade servo system for Kaplan type turbines wherein the runner blades may be rapidly moved to both open and closed positions by utilizing hydrodynamic blade torque bias.

In co-pending application Serial No. 108,814, filed May 9, 1961, there is disclosed a conventional Kaplan type turbine runner blade servo system together with an improved system wherein the actuating mechanism for shifting the angular position of the runner blades is housed within the rotating assembly. The advantages of such an improved system in eliminating the piping and rotary seals of conventional Kaplan turbines are adequately brought out in the aforementioned patent application. There is, however, a disadvantage in such an improved system in rapidly meeting changes in the power demands of the generator and in initially bringing the turbine up to speed.

The power demand of a generator may vary instantaneously and it is, of course, desirable that the turbine accept the change in load requirements rapidly. A comparatively large fast acting servo mechanism may be utilized to control the wicket gate movements. However, space requirements limit the size of the servo motor which may be utilized to control the runner blade movements when the actuating mechanism is housed within the rotating assembly as disclosed in the aforementioned patent application. When a decreased power requirement arises, normally the rapidly moving wicket gates may themselves provide the prompt response necessary to properly adjust the turbine to this decreased power requirement and the slower response of the runner blades to a more closed position is not of consequence. However, when a load is rejected quickly and the wicket gates respond appropriately, there is a period of time during which the wicket gates are almost closed while the runner blade opening is still inappropriately large. Under these circumstances the turbine may operate with objectionable roughness. An increased load may be met by the turbine only by the proper adjustment of both the wicket gates and runner blades to the more open position and hence the slower moving runner blades determine the time within which the turbine adjusts to the increased load. Furthermore, for the protection of the thrust bearings of the turbine, it is advantageous, when starting up a turbine, to bring the turbine up to speed as rapidly as possible with a minimum loading of the thrust bearing. This is achieved by starting the runner blades in an open position although in such position a turbine may run so roughly that synchronization of the runner blade setting with the wicket gate setting is often difficult. The rapidity with which the runner blades may be moved to a more closed position is an important factor in order to protect the thrust bearings and rapidly synchronize the operation of the turbine.

In patent application Serial No. 109,717, filed May 12, 1961, there is disclosed a turbine runner blade actuating system wherein the hydrodynamic torque acting on the runner blade and tending to move the blade to a more open position is utilized. Means is provided whereby upon an increased power demand this torque will rapidly move the runner blades to the desired more open setting in accordance with the wicket gate setting.

It has been found that in certain applications of variable pitch propeller type turbines there is a hydrodynamic blade opening torque bias when the wicket gate opening is inappropriately large as compared with the runner blade opening and that, when the runner blade opening is disproportionately large as compared with the wicket gate opening, there is a hydrodynamic torque bias in the blade closing direction. The present invention provides means for utilizing this hydrodynamic blade torque bias for both opening and closing of the blades. Thus, the runner blades may be both opened and closed with great rapidity thereby avoiding the disadvantages of slow moving blades as outlined hereinbefore.

According to the present invention the rotating assembly of the turbine includes a casing with the runner blades rotatably journalled therein, the rotating assembly including a servo motor operatively connected to the runner blades, a pump and means for driving the pump. The casing itself may constitute the reservoir for the pump. In these respects the structure is similar to the structure disclosed in the co-pending application hereinbefore referred to. The servo motor comprises a piston and cylinder assembly and each end of the cylinder is connected by way of a passageway with the oil reservoir. A non-return check valve is provided in each of the passageways so that when there is a hydrodynamic torque acting on the runner blades tending to move the blades in the direction in which the pump is driving the blades, the hydrodynamic torque will overrun the servo means and provide for a rapid opening or closing of the blades.

A primary object of the present invention is to provide in a runner blade servo system disposed within the rotating assembly of a turbine means for rapidly moving the runner blades to more open and more closed positions by utilizing the hydrodynamic torque acting on the blades when such force is available.

Another object of the present invention is to provide in a runner blade servo system disposed within a rotating assembly of a turbine a servo motor for driving the runner blades toward both more open and more closed positions wherein independent passageways interconnect the ends of the cylinder with the reservoir and such passageways being provided with non-return check valves so that hydrodynamic torque acting on the blades and tending to move the blades in a direction in which the blades are being moved by the servo motor will overrun the servo motor to provide for a rapid runner blade movement.

Figure 2:
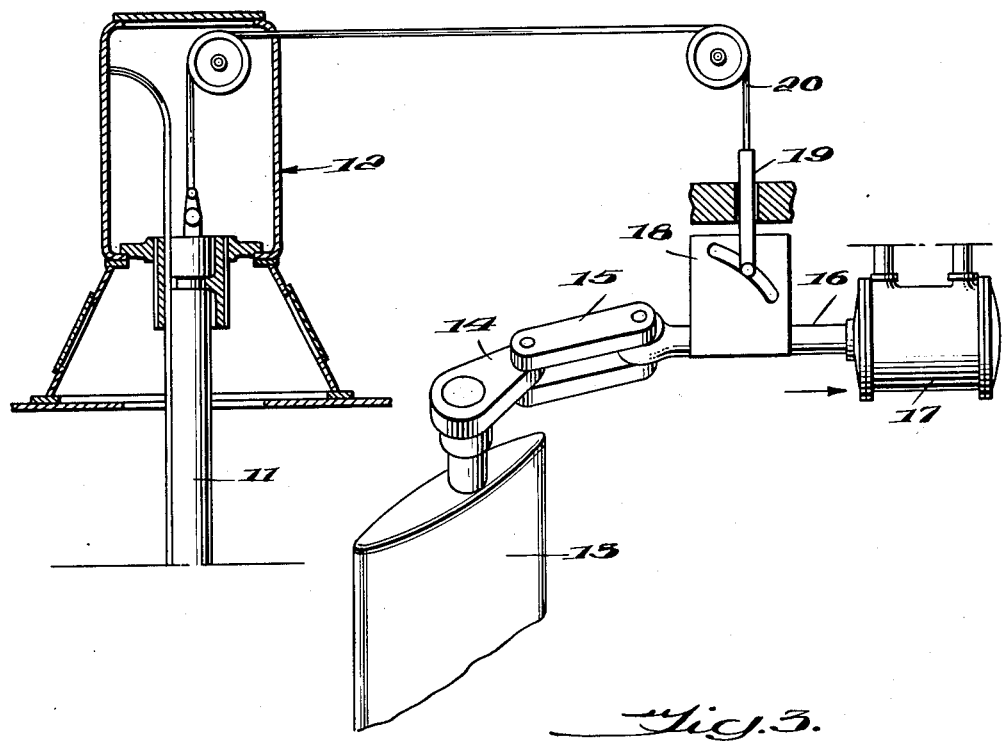
Figure 3:
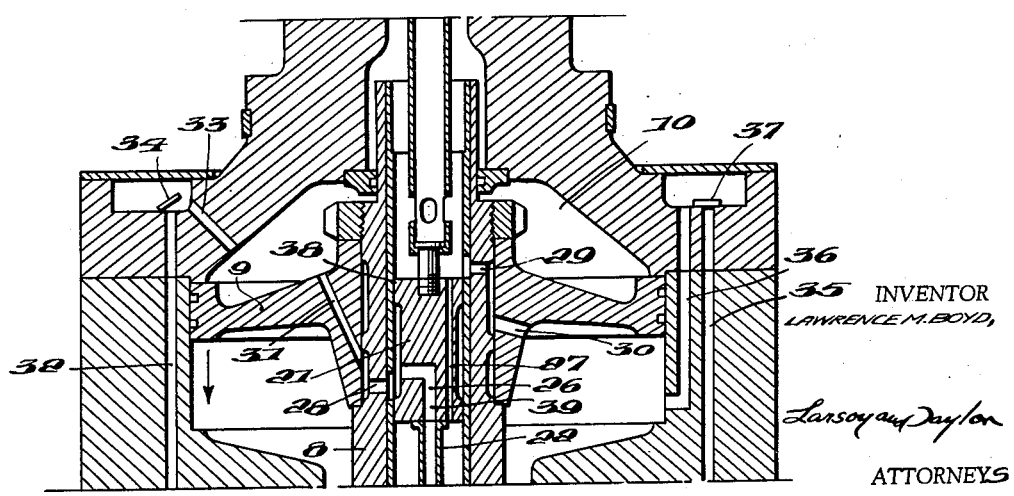
Figure 4:
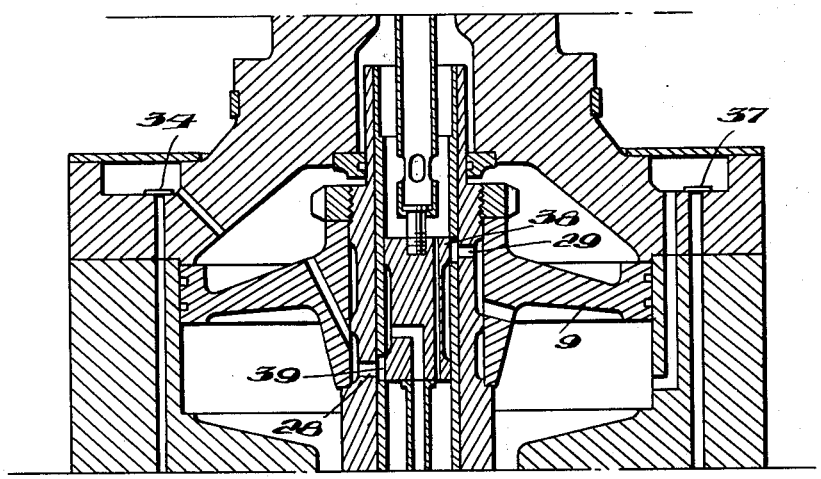
Figure 5:
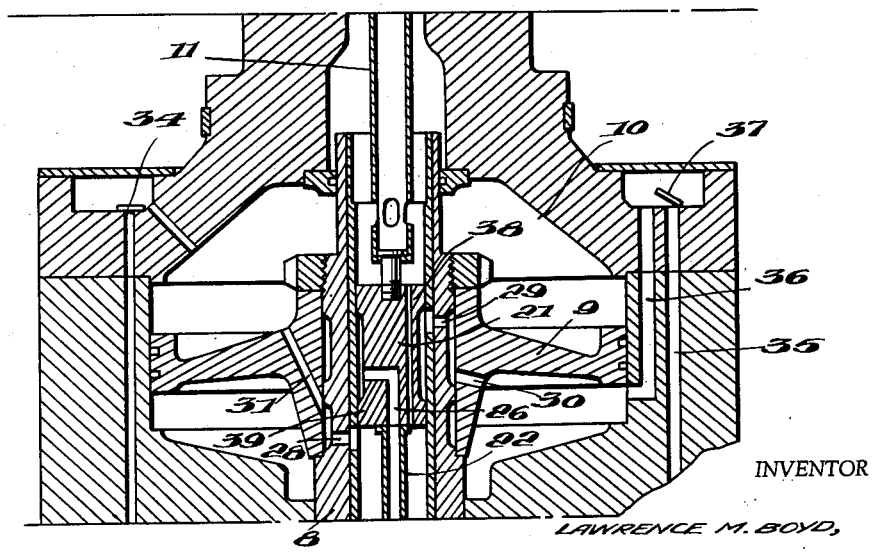

Other objects and many of the attendant advantages of the present invention will become more readily apparent upon consideration of the following detailed specification in connection with the accompanying drawings wherein:

FIG. 1 is an elevational view partly in section of a portion of the runner blade control system according to the present invention, FIG. 2 is a view partly in section of another portion of the runner blade control system, FIG. 3 is a sectional view showing the control valve in position to shift the blade actuating piston downwards to open the blades, FIG. 4 is a sectional view showing the control valve and piston in equilibrium, and FIG. 5 is a sectional view showing the control valve in position to shift the blade actuating piston upwards to close the blades.

Referring now more specifically to the drawings wherein like numerals indicate like parts throughout the several views there is shown at 1 in FIG. 1 a rotatable casing structure including a hub 2, the hub providing means to rotatably journal runner blades 3 and 4. A hollow shaft 5 extends from the rotatable casing and this shaft drives the rotor of a generator (not shown). The runner blades are driven by water fed thereto through a casing (not shown) surrounding the runner blades. A plurality of wicket gates are mounted within this casing and the angular position of these wicket gates is set in accordance with the power demand on the turbine. It has been found that the turbine runs more smoothly and efficiently when the runner blades are set at a specific angular position for each angular position of the wicket gates.

The runner blades are rotatably journalled in the hub 2 of the rotatable casing structure and are connected with a crosshead 6 by means of links such as shown at 7 interconnecting runner blade 3 with the crosshead 6. The linkage interconnecting the runner blade 4 with crosshead 6 is not shown for the sake of clarity but it will be understood that each of the runner blades is operatively connected with the crosshead 6 in such a manner that movement of the crosshead along the longitudinal axis of the casing structure 1 will cause simultaneous movement of the runner blades.

The crosshead 6 is connected with a piston rod 8 which has the upper end thereof fixed to a piston 9 slidable within a cylinder 10. It can be readily appreciated that the piston and crosshead are interconnected so that movement of the piston will produce corresponding movement of the crosshead and hence vary the angular position setting of the runner blades. The piston 9 and cylinder 10 comprise a servo motor controlled by a valve mechanism and rod 11 which extend upwardly through the generator (not shown) to a fixed casing 12, FIG. 2.

In FIG. 2 there is shown a wicket gate 13 which is connected by links 14 and 15 with the piston rod 16 of a servo motor 17. The piston rod 16 has mounted thereon a cam 18 and this cam is provided with a cam follower 19 connected with control cable 20 which is secured to the upper end of control rod 11. A suitable power source supplying hydraulic fluid to either end of servo motor 17 drives the piston rod 16 in either direction to determine the angular setting of wicket gate 13. Through the cam and cam follower the control rod 11 will position the valve means so that the runner blades will be shifted to a predetermined position corresponding to the setting of the wicket gates as will appear more clearly hereinafter.

The lower end of the control rod 11 has a spool shaped valve body 21 mounted thereon and a hydraulic pressure pipe 22 interconnects the spool valve with a pump 23. The pump 23 has an inlet 24 as shown and is driven by a motor 25 having current supplied thereto through electric cable 25A.

The spool valve 21 is shown in section in FIG. 3 and it can be seen that the hydraulic pressure pipe 22 communicates with duct 26 within the spool valve. The valve body is provided with a return passageway 27. Ports 28 and 29 are provided in the piston rod 8. Duct 30 connects port 29 with the lower side of piston 9 as viewed in FIG. 3 and duct 31 connects port 28 with the upper side of the piston 9.

Passageways 32 and 33 interconnect the reservoir comprising the casing 1 with the cylinder 10 above the piston 9. There is provided a non-return check valve 34 at the end of passageway 32. Similarly there are provided passageways 35 and 36 interconnecting the reservoir with the cylinder 10 beneath the piston 9. A non-return check valve 37 is mounted at the end of passageway 35.

The operation of the presently disclosed system will now be described. The casing structure of the rotating assembly serves as a reservoir containing oil whose free surface may be at any desired level within the hollow shaft 5. Filling of the casing may take place through the hollow shaft. As the wicket gates 13 shown in FIG. 2 move to a more open position the piston rod 16 moves in the direction shown by the arrow in FIG. 2. This movement of the cam 18 will cause the control rod 11 to be lowered. The position of the valve parts are shown in FIG. 3. The lowering of spool valve 21 causes the land 38 to uncover port 29 so as to interconnect duct 30, and port 29 with the passageway 27 returning to the reservoir. Land 39 uncovers port 28 so as to interconnect the hydraulic pressure pipe with the space above the upper surface of piston 9. In this position of the spool valve 21 hydraulic fluid will be pumped to the space above the upper surface of the piston 9 to force the piston downwardly and force hydraulic fluid through the duct 30, port 29 and return duct 27 to the reservoir. The piston 9, shaft 8, and crosshead 6 will move downwardly until the lands 38 and 39 again cover ports 29 and 28 respectively. The movement of the crosshead will cause the runner blades to open and assume an angle corresponding with the changed angle of the wicket gates. The operation of the runner blade actuating system as described thus far is similar to that disclosed in the prior applications hereinbefore referred to. However, the presently disclosed system provides a means for utilizing any hydrodynamic torque acting on the runner blades and tending to shift the blades in the direction in which the servo mechanism is moving the blades.

In the event that there is a hydrodynamic torque acting against the runner blades tending to move the runner blades to a more open position when the control valve 21 is in the position shown in FIG. 3, this hydrodynamic torque will act through the crosshead 6, shaft 8, and piston 9 to tend to move the piston 9 downwardly and thus open the check valve 34 to permit oil to flow freely from the reservoir to the space within the cylinder 10 above the piston 9. Thus the hydrodynamic torque will override the action of the servo motor and permit the runner blades to move to an open position more quickly.

In FIG. 4 the piston 9 is shown in a position of equilibrium with the land 38 covering port 29 and the land 39 covering port 28. In this position there is no connecting passageway open on either side of the piston 9 and the piston cannot be shifted in position even if hydrodynamic torque is tending to move the piston 9 since neither side of the piston is connected with the oil reservoir and the check valves 34 and 37 will not open in a direction to permit return flow from the cylinder 10 to the reservoir.

In FIG. 5 the parts are shown in the position in which the control rod 11 has, in response to movement of the wicket gates, moved the spool valve 21 upwardly so that the hydraulic pressure pipe 22 is connected through duct 26, port 29 and duct 30 to permit hydraulic fluid to be pumped to the space within the cylinder 10 below piston 9. The space within cylinder 10 above piston 9 is connected with the reservoir through duct 31 and port 28. It can be seen that in this position of the valve the piston 9 will move upwardly until the shaft 8 reaches a position wherein the ports 28 and 29 are again covered by the lands 39 and 38, respectively. In the event that there is a hydrodynamic torque acting on the runner blades and tending to move the runner blades to a more closed position this torque will act through the crosshead 6 and shaft 8 and tend to move the piston 9 upwardly so as to open the check valve 37 and permit hydraulic fluid to pass through the passageways 35 and 36 to the cylinder 10 beneath the piston 9. Thus the hydrodynamic torque will override the movement of the piston 9 by the motor 23 and will cause a more rapid closing movement of the runner blades.

It can be seen that by virtue of the present invention there is provided a servo motor means for moving the runner blades to a position corresponding to the setting of the wicket gates. In addition, the presently disclosed system provides a means for utilizing any hydrodynamic torque acting on the runner blades and tending to move the runner blades in a direction corresponding to the direction in which the servo motor means is moving the runner blades. Such hydrodynamic torque will override the servo motor means and will rapidly move the runner blades to the desired setting. In this manner the roughness resulting from slow closing movement of the runner blades to correspond to a more closed setting of the wicket gates is overcome and a smoother overall operation of the turbine is assured.

Obviously, many modifications and variations of the present invention are possible in light of the above teachings. What is claimed as new and desired to be secured by Letters Patent is:

1. In a Kaplan type turbine including adjustable wicket gates and wicket gate operating mechanism for changing the setting of the wicket gates to control the flow of water to turbine runner blades, a rotataing assembly including a rotatable shaft, a casing rigidly secured to said shaft, a liquid reservoir disposed within said casing, runner blades journalled in said casing for rotating about axes radial to the casing, and means for shifting the position of said runner blades in response to change in the position of said wicket gates, said means being disposed in the casing and comprising a pump and hydraulic servo motor means including a piston and cylinder assembly, means connecting said piston with said runner blades, control valve means for connecting each side of said piston selectively with the reservoir and the output of said pump, independent passageways interconnecting each side of said piston with the reservoir and non-return check valves in said passageways whereby when said servo motor is driving the runner blades to a predetermined angular position hydrodynamic torque acting on the blades and tending to move the blades in the same direction as the servo motor will open the check valve interconnecting the reservoir with that side of the piston to which the output of the pump is connected and permit the flow of hydraulic fluid through said last named passageway so that the hydrodynamic torque overrides the pump and permits rapid movement of the blades to the desired angular position.

2. A turbine having wicket gates and runner blades set in angular position in predetermined relation to the wicket gate position, control means comprising a rotatable assembly including a casing, a pump and servo motor means operatively interconnected with said runner blades for driving said runner blades towards open and closed positions, said casing constituting a reservoir for supplying hydraulic fluid for said pump for driving said servo motor, said servo motor comprising a piston and cylinder, and means including a separate passageway interconnecting each end of the cylinder with the reservoir and non-return check valves in each passageway for permitting movement of said blades rapidly in response to hydrodynamic torque acting on the blades.

3. In a Kaplan type turbine including adjustable wicket gates and wicket gate operating mechanism for changing the setting of the wicket gates to control the flow of water to turbine runner blades, a rotating assembly including a rotatable shaft, a casing rigidly secured to said shaft, a liquid reservoir disposed within said casing, runner blades journalled in said casing for rotating about axes radial to the casing, means for shifting the position of said runner blades in response to change in the position of said wicket gates, said means being disposed in the casing and comprising a pump and hydraulic servo motor means including a piston and cylinder assembly, means connecting said piston with said runner blades, control valve means for connecting each side of said piston selectively with the reservoir and the output of said pump, at least one non-return check valve connecting one side of the piston with the reservoir, movement of the control valve to connect said one side of the piston with the pump and the other side of the piston with reservoir together with hydrodynamic torque acting on the blades tending to move the blades in the same direction as the pump is moving the piston causing the non-return check valve to open so that said piston is connected to the reservoir on both sides and is moved by hydrodynamic force to position the blades in the desired angular position thereof.

References Cited in the file of this patent

UNITED STATES PATENTS

| 1,950,776 | Biggs | Mar. 13, 1934 |
| 1,952,566 | Ring | Mar. 27, 1934 |
| 2,518,925 | Nussbaum | Aug. 15, 1950 |

FOREIGN PATENTS

| 193,324 | Austria | Nov. 25, 1957 |
| 703,319 | Germany | Mar. 6, 1941 |
| 757,575 | Great Britain | Sept. 19, 1956 |